Oct. 16, 1951     J. ORLANSKY     2,571,158
ILLUMINATED AIRCRAFT WING TIP
Filed March 4, 1949
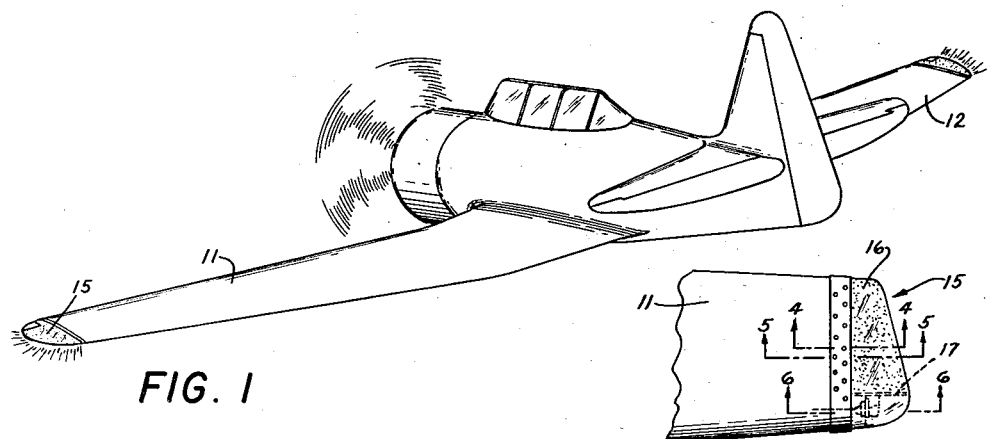
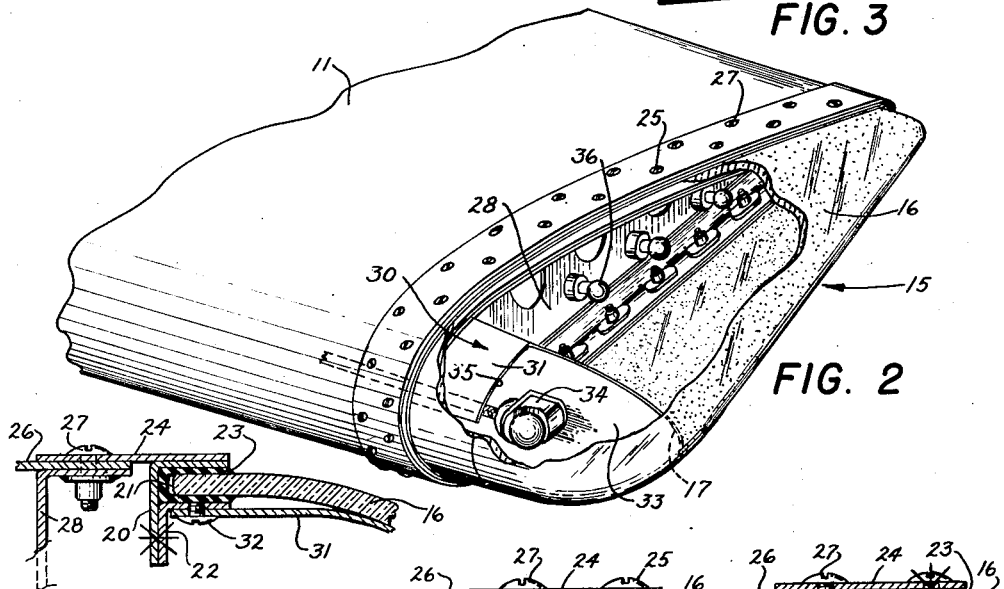
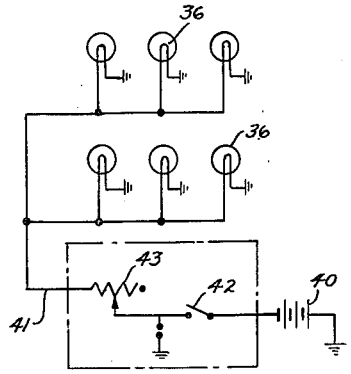
INVENTOR.
JESSE ORLANSKY
BY
ATTORNEY Patented Oct. 16, 1951

2,571,158

UNITED STATES PATENT OFFICE 2,571,158

ILLUMINATED AIRCRAFT WING TIP

Jesse Orlansky, New York, N. Y.

Application March 4, 1949, Serial No. 79,661

3 Claims. (Cl. 244—129)

(Granted under the act of March 3, 1883, as amended April 30, 1928; 370 O. G. 757)

This invention pertains to the art of aircraft lighting, and it comprises a wing-tip construction for airplanes or the like that is adapted to illuminate the airplane in a novel manner.

For night flying, and particularly for night flying in a formation that involves a plurality of planes, it is desirable that the several planes of the formation be illuminated distinctively, for their identification within the formation and for identification by ground observers. The present invention is directed to accomplishing this purpose.

The invention is embodied in a wing-tip structure that replaces the conventional prior-art wing-tip section, which is opaque. The invention comprises a shell of transparent or translucent material that is formed to the contour of the conventional wing tip. The shell constitutes a container for one or more lighting fixtures. These may be positioned within the shell itself, or in the cavity of the wing behind the attached shell. The shell is frosted to diffuse light that emanates from the light source.

The described construction produces a wing tip that glows and can be clearly seen by persons in other airplanes of the formation without sacrificing the pilots' dark adaptation, thus enabling a group to fly in close formation at night. The illuminated wing tip can be seen at a great distance, and enables identification, as also determination of speed, direction, attitude and orientation of an airplane by an observer in flight or on the ground. This information is useful in a number of ways for night flying. The glowing wing tip of the present invention is additional to whatever running or landing lights are conventionally present in aircraft.

In the practical application of the invention, a portion only of the shell of the wing-tip structure is frosted, the remaining portion of the shell being clear. An opaque partition within the shell divides the cavity thereof into two compartments, and extends to the boundary between the frosted and clear portions of the shell. The two portions of the shell are separately lighted. For example, the forward portion of the wing tip is clear to a line that is demarked by the opaque partition, the remainder of the surface rearwardly from the partition being frosted. The running light is contained in the compartment that is clear, and a separate light source is contained in the compartment that is frosted, the partition operating to prevent light from either source becoming confused with the light from the other source.

For a more thorough understanding of the principles of the present invention, and for a disclosure of one practical embodiment thereof, attention is now directed to the drawings, in which Fig. 1 is a perspective of an airplane in flight, the aircraft embodying the invention, Fig. 2 is a detailed perspective of left wing tip of the airplane of Fig. 1, Fig. 3 illustrates the wing tip of Fig. 2 in plan, Figs. 4, 5 and 6 are cross-sectional elevations, taken on lines 4—4, 5—5 and 6—6 respectively of Fig. 3, and Fig. 7 is a diagram of wiring suitable for carrying out the principles of the invention.

The respective left and right wings 11 and 12 of the airplane in Fig. 1 comprise the tips 15 that embody the present invention. The structures of both tips 15 are symmetrically opposite, and are otherwise the same. The tip of the left wing 11 is illustrated in detail in Figs. 2 and 3.

The wing-tip construction of the present invention comprises a shell 16 of any suitable transparent or translucent material. The shell 16 is frosted on its interior surface, the frosting extending throughout the inside area that is rearwardly from a line at 17.

The shell 16 is attached to a frame along its rim to form a wing-tip section, which is attached to the wing structure of 11 or 12. A piece of angle metal 20 is formed to fit the rim 21 of the shell 16 exteriorly, and another piece of angle metal 22 is formed to fit interiorly of the rim. The two angle pieces 21 and 23 are positioned together, as illustrated in Figs. 4, 5 and 6, with two legs, one of each piece, spaced apart to form a groove into which the rim 21 of shell 16 fits, and into which the rim is able to be seated. A strip 23 of rubber or other suitable packing material is projected into the groove formed by pieces 20 and 22, and serves as a shock absorbing mount for the shell 16. If desired, the angle pieces 20 and 22 can be secured together along their contacting surfaces, by welding or other suitable means.

A piece of flat strip stock 24 is attached to the channel formed of pieces 20 and 22 by means of bolts 25 arranged at spaced intervals around the rim 21. See Fig. 4. If desired, the strip 24 may be attached to piece 20 additionally by means of welding or by other suitable means. The bolts 25 are projected through suitably located holes in the shell 16 to complete and secure assembly of the tip 15 to comprise a component or section adapted for attachment to the wing 11 or 12. The strip 24 fits over the skin 26 of the wing 11 or 12. Bolts 27 are arranged at spaced intervals around the strip 24, and pass through the strip and the wing skin 26, the bolts 27 also passing through the flange of rib or bulkhead 28. See Fig. 5. By this means the wing-tip section 15 is attached to the wing 11 or 12. The bolts 25 and 27 are arranged staggered as shown in Figs. 2 and 3.

A light shield 30 is mounted inside the shell 16, and comprises a flange or apron 31, which is fastened to the inside of the angle piece 22 by means of screws 32, and thereby secured to the strip 24. See Fig. 6. The shield 30 comprises the partition 33 which extends beyond the flange 31 to the inside surface of the shell 16, the edge of the partition lying along the line 17 that divides the frosted and unfrosted areas. The shield 30 provides a base for the lighting fixture 34 that provides a running light within the leading edge at the tip of the wing 11 or 12.

Conventionally the light of fixture 34 is either red or green, depending upon whether it is the port or starboard light respectively, i. e., mounted at the tip of the left or right wing. The unfrosted portion of the shell 16 forward of the line 17 comprises a lens or globe for the running light 34, which is located along the leading edge of the wing 11 or 12 at its tip. The lights 34 are therefore visible from the front of the craft, and one or the other is visible from the left or right in front, in accordance with the requirements of conventional navigation standards. The apron 31 extends forwardly of the partition 33, and the position of the edge 35 thereof determines the angle to the right or left front from which the running light of the opposite side is capable of being seen. The partition 33 prevents light from the running light 34 from shining into the space rearwardly of line 17, which light therefore does not appear in the frosted area.

A set of electric lights 36 are housed by the shell 16 within the frosted portion thereof. Under the practice shown, the lights 36 are mounted on the bulkhead 28, in positions to light the frosted portion of the shell 16 causing it to glow. The partition 33 prevents light from the bulbs 36 from appearing on the shell 16 forwardly of the line 17. Any number of light bulbs 36 may be provided suitably distributed along the bulkhead 28 to provide the desired uniformity and intensity of glow to emanate from the frosted area of tip 15.

The electrical system illustrated in Fig. 7 has been used and found satisfactory. It comprises a battery 40 or other suitable source of electrical energy, and line 41 from the battery 40 to the light bulbs 36. A switch 42 is placed in the line to enable the pilot to turn the lights on or off, and to turn them on at night or during conditions of poor visibility when wing-tip illumination is desired. The variable resistance 43 is also provided in the system to enable the pilot to control the intensity of glow of the wing tips 15 under various weather conditions and degrees of visibility.

The frosted shell 16 presents a distinctive appearance in daylight. The wing-tip structure of the present invention serves as a means for identification under practically all conditions of flying visibility.

The disclosed structure is one practical embodiment of the invention, the scope of which is not limited to the specific structure shown. The scope of the invention is determined by the accompanying claims.

The invention described herein may be manufactured and used by or for the Government of the United States of America for governmental purposes without the payment of any royalties thereon or therefor.

I claim:

1. A wing-tip section for airplanes or the like comprising a shell of transparent material formed to the contour of and adapted to be positioned to constitute the wing tip of an airplane, a portion of the surface of the shell being frosted, another portion of the shell being clear, a strip secured along the edge of the shell for attaching it to the wing of the airplane, a partition of opaque material secured to the strip and projecting into the cavity of the shell, the partition extending to the wall of the shell along the boundary between the frosted and clear portions thereof to provide separated compartments for light on respective opposite sides of the partition.

2. In the wing of an airplane or the like, a wing-tip construction comprising a shell of transparent material formed to the contour of and positioned to constitute the wing tip of the airplane, a portion of the surface of the shell being frosted, another portion of the shell being clear, a strip secured to the shell along its edge, the strip being secured to the wing of the airplane to secure the shell thereto, one or more lighting fixtures housed in the frosted portion of the shell, another lighting fixture contained in the clear portion of the shell, an opaque partition secured to the strip and projecting into the cavity of the shell between the lighting fixtures of the respective frosted and clear portions thereof, the partition extending to the wall of the shell along the boundary between the frosted and clear portions thereof to provide separated compartments for light on respective opposite sides of the partition.

3. In a wing-tip section as defined in claim 1, a lighting fixture mounted on the partition on one side thereof.

JESSE ORLANSKY.

REFERENCES CITED

The following references are of record in the file of this patent:

UNITED STATES PATENTS

| Number | Name | Date |
| --- | --- | --- |
| 1,497,760 | Lyon et al. | June 17, 1924 |
| 2,375,075 | Carruth | May 1, 1945 |